Patented Oct. 4, 1932

1,880,560

UNITED STATES PATENT OFFICE

CHARLES S. WEBBER, OF SPRINGFIELD, MASSACHUSETTS, AND CYRIL J. STAUD, OF ROCHESTER, NEW YORK, ASSIGNORS TO EASTMAN KODAK COMPANY, OF ROCHESTER, NEW YORK, A CORPORATION OF NEW YORK

PROCESS FOR THE HYDROLYSIS OF CELLULOSE ACETATE

No Drawing. Application filed December 14, 1929. Serial No. 414,210.

This invention relates to a process for the hydrolysis of cellulose acetate and particularly to effecting such a hydrolysis in the presence of unsaturated carboxylic acids.

As is well known in this art cellulose, as originally acetylated, is a triacetate and is insoluble in the usual solvents from which solutions the hydrolyzed ester is formed into films, sheets and other commercial products. It is, therefore, necessary to hydrolyze, or, as some term this process, saponify the cellulose triacetate, that is, remove some of the acetyl groups that are combined with the cellulose and thereby render the ester soluble in the usual commercial solvents and primarily, acetone. In effecting this hydrolysis of the cellulose acetate it is the desire of the manufacturer to produce a product having the maximum degree of flexibility, transparency and durability. In order to realize such results it is important that the following factors be borne well in mind. The hydrolysis of the cellulose acetate must not, excepting under conditions disclosed in our copending application, Serial Number 414,209, be carried greatly above 60° C. nor the cellulose ester be allowed to contact for any considerable period of time with the hydrolyzing catalysts, such as strong mineral acids, nor the use of large quantities of such drastic catalysts be employed in the hydrolysis or an ester will be produced having considerable degradation and because of that degradation insufficient strength and durability for most industrial uses.

Workers in this art have long realized that a product having high viscosity likewise was substantially undegraded and therefore as a criterion of quality such esters were sought.

Various expedients have been tried in order to effect such hydrolysis of the cellulose acetate.

An object of the present invention is to provide a process for the hydrolysis of cellulose acetate in which little or no degradation of the ester results. Another object of this invention is to effect the hydrolysis of cellulose acetate in a solution containing an unsaturated organic carboxylic acid. Other objects will hereinafter appear.

We have found that a cellulose acetate from the first stage, that is, a cellulose triacetate of chloroform solubility or of the difficultly chloroform soluble but soluble in alcohol-chloroform type, is treated, in a solution at the usual hydrolyzing temperature and for a suitable time, with an unsaturated mono or dibasic carboxylic acid, may be hydrolyzed without any substantial degradation. The product will likewise be found, when compared with a like solution of the ordinary hydrolyzed cellulose acetate, to have a higher viscosity than those prepared by the former processes.

The unsaturated mono and dibasic carboxylic acids which we have found suitable for the hydrolysis of cellulose acetate include such unsaturated acids as those having the formula $C_nH_{2n-2}O_2$ or $C_mH_{2m-1}COOH$ or specifically the unsaturated mono basic carboxylic acids, acrylic, crotonic, angelic, tiglic and the unsaturated dibasic carboxylic acids including such acids as maleic, fumaric and their anhydrides.

These acids may be added to the first stage acetylating baths in the presence of the hydrolysts such as water, a small amount of a suitable hydrolyzing catalyst and glacial acetic acid or equivalent aliphatic organic acid and the resultant solution held at a temperature of approximately 100° F. until a cellulose acetate having the desired degree of solubility has been obtained. This will require, in some instances, about 55 hours. It will be understood that by increasing the temperature of the hydrolyzing bath that the time of hydrolysis will necessarily be decreased and at a lower temperature, of course, an increase in the time for obtaining the same degree of hydrolysis will be required.

We have found that in order to effect optimum results it is desirable to have present in the hydrolzing bath from one to three parts of an unsaturated mono or dibasic carboxylic acid for every five parts of the cellulose acetate present in that bath. By the use of such proportions a substantially undegraded cellulose acetate having the desired degree of solubility in acetone may be prepared. It will be understood, however, that a continuation of hydrolysis, particularly in the presence of large quantities of unsaturated acid, below acetone solubility will not necessarily give a product having the most desirable qualities as some substitution by the unsaturated acid may result. We have found that an optimum percentage for most unsaturated organic acids, of approximately 20 parts of the acid to 50 parts of the cellulose acetate present will give excellent products having high viscosity and good quality.

In comparing the viscosity of products obtained by our process we have found that hydrolysis, omitting the maleic or other unsaturated acid, will give a cellulose acetate, when dissolved in an acetone solution in the proportions of 4 parts of acetone to 1 part cellulose acetate, having a viscosity by the drop-ball method of approximately 36 seconds while the same hydrolysis, that is, a hydrolysis of cellulose acetate of the same type with the same hydrolyzing bath except for the addition of an unsaturated organic acid, will produce a cellulose acetate having viscosity of as much as 70 seconds. It has been likewise found, as would be expected from the above considerations, that these products when formed into sheets or films are almost 25% more flexible than those from cellulose acetates which have not been hydrolyzed by this treatment.

We shall now give an example for conducting our process but it will be understood that we shall not be restricted in our invention to the proportions and ingredients therein given except as indicated in the appended claims.

To 550 parts of an acetylating solution containing cellulose acetate, acetic acid, acetic anhydride and a catalyst as prepared by the acetylating process described in U. S. Patent 1,683,347 of H. LeB. Gray and Cyril J. Staud there are added 26 parts of water, 2 parts of concentrated hydrochloric acid, 40 parts of glacial acetic acid and 20 parts of maleic acid. This hydrolyzing bath may be allowed to stand at a temperature of approximately 100° F. until the cellulose acetate becomes soluble in acetone which requires approximately 55 hours. Such a product had a viscosity of 68 seconds when tested by the drop-ball method in an acetone cellulose acetate solution having a ratio of 4 to 1.

This hydrolysis may likewise be used for the treatment of fibrous cellulose triacetate by first dissolving the ester in a suitable solvent such as 1-4 dioxan and water or the usual organic acids employed for this purpose and then adding the unsaturated organic acid and effecting the acetylation in a manner similar to that described above.

It will be understood that any of the described unsaturated carboxylic acids or their equivalents may be utilized in this process in various proportions depending upon the degree of purity desired in the final product, or any type of cellulose triacetate hydrolyzed in any of the usual hydrolyzing baths in the presence of these acids without in any way departing from this invention or sacrificing any of its advantages.

Having now described our invention, what we claim as new and desire to be secured by Letters Patent of the United States is:

1. In the process for the manufacture of acetone-soluble cellulose acetate the step which comprises hydrolyzing the ester in the presence of maleic acid.

2. In the process for the manufacture of acetone-soluble cellulose acetate the step which comprises hydrolyzing the ester in the presence of maleic acid, acetic acid and water.

3. In the process for the manufacture of acetone-soluble cellulose acetate the step which comprises hydrolyzing the ester in a bath containing 40 parts of maleic acid per 100 parts of cellulose acetate present.

4. In the process for the manufacture of acetone-soluble cellulose acetate the step which comprises hydrolyzing the ester in the presence of an acid selected from the group consisting of the unsaturated aliphatic mono and dibasic carboxylic acids.

5. In the process for the manufacture of acetone-soluble cellulose acetate the step which comprises hydrolyzing the ester in the presence of acetic acid, water and an acid selected from the group consisting of the unsaturated aliphatic mono and dibasic carboxylic acids.

Signed at Springfield, Mass., this 3rd day of December, 1929.

CHARLES S. WEBBER.

Signed at Rochester, New York, this 6th day of December, 1929.

CYRIL J. STAUD.